(12) United States Patent
Sturzebecher (10) Patent No.: US 7,987,566 B2
(45) Date of Patent: Aug. 2, 2011

(54) CAPACITOR FORMING METHOD

(76) Inventor: Richard J. Sturzebecher, Tinton Falls, NJ (US)

( * ) Notice: Subject to any disclaimer, the term of this patent is extended or adjusted under 35 U.S.C. 154(b) by 61 days.

(21) Appl. No.: 12/458,549

(22) Filed: Jul. 15, 2009

(65) Prior Publication Data

US 2011/0010905 A1    Jan. 20, 2011

(51) Int. Cl.
*H01G 7/00*    (2006.01)
(52) U.S. Cl. ............... 29/25.42; 29/25.41; 29/25.03; 29/623.1; 29/623.5; 361/311
(58) Field of Classification Search ....... 29/25.01–25.03, 29/25.41–25.42, 592.1, 594, 830, 846–847; 361/311, 303, 523–529
See application file for complete search history.

(56) References Cited

U.S. PATENT DOCUMENTS

| | | | |
|---|---|---|---|
| 2,449,952 A | 9/1948 | Pridham | |
| 2,695,239 A | 11/1954 | Oshry | |
| 3,195,030 A | 7/1965 | Herczog et al. | |
| 3,405,002 A | 10/1968 | Martin | |
| 3,480,421 A | 11/1969 | Allen | |
| 3,615,757 A | 10/1971 | Herczog et al. | |
| 3,720,862 A | 3/1973 | Mason | |
| 3,816,172 A | 6/1974 | Hoffman | |
| 3,940,667 A | 2/1976 | Pearce | |
| 3,977,857 A | 8/1976 | Mattox | |
| 4,084,975 A | 4/1978 | Faust | |
| 4,101,952 A | 7/1978 | Burn | |
| 4,687,540 A * | 8/1987 | Singhdeo et al. | 216/6 |
| 4,788,163 A | 11/1988 | Hang et al. | |
| 4,959,089 A | 9/1990 | Bhargava et al. | |
| 4,997,795 A | 3/1991 | Hang et al. | |
| 5,167,687 A | 12/1992 | Muragishi et al. | |
| 5,350,637 A | 9/1994 | Ketcham et al. | |
| 5,889,647 A * | 3/1999 | Hansen et al. | 361/311 |
| 6,207,522 B1 * | 3/2001 | Hunt et al. | 438/393 |
| 7,029,971 B2 * | 4/2006 | Borland et al. | 438/250 |
| 7,290,315 B2 * | 11/2007 | Palanduz et al. | 29/25.41 |
| 7,453,144 B2 * | 11/2008 | Palanduz | 257/700 |
| 7,601,181 B2 * | 10/2009 | Borland et al. | 29/25.03 |
| 7,818,855 B2 * | 10/2010 | Borland et al. | 29/25.42 |
| 2002/0098969 A1 | 7/2002 | Nakamura et al. | |
| 2003/0037569 A1 | 2/2003 | Arbab et al. | |

(Continued)

FOREIGN PATENT DOCUMENTS

JP    6-96983 A    4/1994

OTHER PUBLICATIONS

Members of Congress take a stab at EEstor . . . , 11 pages printed from the Internet, May 6, 2009 http://bariumtitanate.blogspot.com/2009/03/members-of-congress-take-stab-at-eestor.html.

(Continued)

*Primary Examiner* — Minh Trinh
(74) *Attorney, Agent, or Firm* — Richard C. Litman (57) ABSTRACT

The capacitor forming method utilizes a plurality of metal sheet manipulating rollers and a glass supply, which, in combination, make a metal-glass laminate and glass or devitrifying glass dielectric to form a capacitor. Several embodiments of the method manufacture ferroelectric crystal dielectrics by utilizing heat-treatment and annealing to form and devitrify glass while the glass is in a metal-glass spool or flat form.

4 Claims, 10 Drawing Sheets

U.S. PATENT DOCUMENTS

| | | |
|---|---|---|
| 2004/0126484 A1* | 7/2004 | Croswell et al. ............ 427/79 |
| 2007/0172652 A1 | 7/2007 | Kawano et al. |
| 2007/0283543 A1 | 12/2007 | Kanasugi |
| 2008/0032199 A1 | 2/2008 | Ohzuku et al. |
| 2008/0041502 A1 | 2/2008 | Branagan |
| 2011/0010905 A1* | 1/2011 | Sturzebecher ............ 29/25.42 |

OTHER PUBLICATIONS

The EEStory.com, 3 pages printed from the Internet, May 6, 2009 http://theeestory.com/.

* cited by examiner

CAPACITOR FORMING METHOD

BACKGROUND OF THE INVENTION

1. Field of the Invention

The present invention relates to passive electronic components, and particularly to a capacitor forming method and to a capacitor formed thereby.

2. Description of the Related Art

It is difficult to "capture a glass" made from a hot melt with a chemical composition that is the same as a ferroelectric crystal. When a hot melt made of ferroelectric metal oxides is cooled slowly, it can be expected to rapidly crystallize into a solid crystalline mass. By fast cooling this composition from a 1400° C. liquid melt, such as when the hot melt is poured directly into water, one can capture a glass (i.e., a viscous liquid), or ferroelectric glass. However, when this glass is quenched in water, the glass shatters into small pieces. Generally speaking, a useful glass shape cannot be formed by quenching in water.

Thus, a capacitor forming method solving the aforementioned problems is desired.

SUMMARY OF THE INVENTION

The capacitor forming method uses a plurality of metal sheet manipulating rollers and a glass supply in combination to manufacture a metal-glass laminate and a glass or devitrifying glass dielectric, thereby forming a capacitor. Several embodiments of the method manufacture ferroelectric crystal dielectrics by performing heat-treatment and annealing steps to form and devitrify glass while the glass is in a metal-glass spool or flat form.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The capacitor forming method uses a plurality of metal sheet manipulating rollers and a glass supply in combination to manufacture a metal-glass laminate and a glass or devitrifying glass dielectric, thereby forming a capacitor. Several embodiments of the method make ferroelectric crystal dielectrics by utilizing heat-treatment and annealing to form and devitrify glass while the glass is in a metal-glass spool or flat form.

All embodiments of the capacitor forming method are intended to work a glass that devitrifies to a ferroelectric with a high dielectric constant. Glass is formed with a metal foil ribbon that runs at high speed on a flat bed or in a spool, thereby creating a laminate. The laminate has heat-soaking properties that encourage the growth of small ferroelectric crystals within the glass (a process called devitrification). The method does not perform heat-treatment on non-devitrifying glass. However, the method heat treats a devitrifiable glass after the glass is formed with a metal ribbon into a capacitor or super-capacitor laminate.

The method utilizes a moving, liquid glass quenching (viscosity~100 to 1000 Poises) metal foil ribbon that combines with the liquid glass. The method uses a roller to spread the glass-foil combination into a thin layer, the roller pressing against the metal foil as it guides over an opposing cooling roller. In this manner, the method laminates multiple layers of metal foil and glass together. The glass intended to be devitrified will grow micro-crystals that are ferroelectric with a high dielectric constant, after it is captured and formed as a glass. The metal foil in motion draws heat rapidly from the glass while it is still fluid to drop the temperature of the glass by 200° C. to 300° C. and thereby prevent early devitrification. As the glass is cooled to the working point temperature (a viscosity of about 10,000 Poise), the glass-to-metal foil forming is completed. At this working temperature, the glass-metal laminate (for a devitrifying glass) can begin heat soaking using a roller kiln or kiln provided by the capacitor forming method to cause small ferroelectric crystals to slowly grow within the glass. After the method completes heat treatment, the method controls a temperature-controlled kiln (Lehr) to slowly lower the temperature of the laminate to room temperature.

The design requirements to create ferroelectric crystals in a manufacturing apparatus to make a capacitor are described next. The various embodiments of the capacitor forming method described herein provide means for fabricating a ferroelectric glass into a capacitor or a super-capacitor.

While using a moving metal foil to contact a controlled amount of hot melt, the glass melt can be quenched to form or capture a crystal-free glass as it is coated on the metal ribbon and formed into a laminate. The metal will absorb heat to help a melted "ferroelectric" composition cool to become captured "as a glass". The melt contacts the metal foil in a hot condition at near 100 poise (where the melt flows like water) in viscosity, and then is rapidly dropped in temperature to 10,000 poise to avoid devitrification, and still form a useful shape for the glass at the working point temperature (10,000 poise).

The moving metal foil is also cooled as it moves over a cooled roller, as the metal foil and roller contact the hot melt.

Oxygen stealing additives, like $B_2O_3$ or $Al_2O_3$, in the chemical composition should be used in the chemical formulation to slow down crystal growth as the glass is cooled.

Delivery of the hot melt to the forming apparatus uses a movable vessel or capsule directly above each metal foil/hot glass squeezing station. The capsule must be insulated in design to hold the melt at a high temperature to prevent devitrification. As the melt temperature drops, it tends to be more viscous and difficult to pour. Various means of spot heating are known to glass technicians practiced in the art, who can adjust the heat and viscosity of the flowing hot glass.

There is a short window between the liquid melt and working temperature. The cooling effect of the metal foil does not extend over a long temperature span. During a temperature drop of 200° C. to 300° C., the glass can be formed into a useful shape. The glass must drop only 200°-300° C., while the metal must gain in heat from 30° C. to 950° C.

The forming apparatus may use low cost metals, such as OFHC copper or brass, that can quench a melt at 1050° C. down to the "working point temperature of 940° C. Special nitrogen or other non-oxygen bearing atmospheres are needed in the follow-on processes if low cost metals are used.

After forming a useful glass-metal shape near the working point temperature for a ferroelectric glass, the heat soaking process can begin immediately to begin growing ferroelectric crystals. Annealing to room temperature would now start for a glass not intended to be devitrified. However, for a glass intended for devitrification, a slow heat-soak, perhaps lasting several hours, may be needed to grow the necessary small microcrystals within the glass. For example, in the third embodiment of the method, described below, the heat soaking process can begin on a production roller kiln as soon as the laminate is formed. After some devitrification to gain stiffness, cutting the flat laminate into pieces with a laser would then permit stacking of these pieces on kiln cars that pass through a large tunnel kiln, as would be needed to complete the heat-soaking process. After heat soaking, the laminated product should be slowly cooled to room temperature by moving the loaded car in the tunnel kiln directly into a Lehr oven designed to accept the same kiln car.

Five production designs provide fast quenching of devitrifiable glass that has first been formed as a glass within a glass-metal laminate in the shape of a spool or flat laminate. They are fast, volume producing apparatus for the manufacture of a capacitor or super-capacitor. By fast forming a glass or a devitrifiable glass into a glass-metal laminate while the melt drops in temperature down to the "working point temperature" of the glass, the glass is thereby formed while still fluid enough to be "worked". Slow devitrification can begin immediately after forming.

The production designs described herein use a moving, metal-foil ribbon to contact a controlled amount of hot glass. This provides rapid forming and quenching of the glass, which is required to secure a glass with limited or no crystalline content, while spooling or flat forming the glass into of a metal-glass laminate. In this process the glass is squeezed at high speed into a thin dielectric layer, common to capacitor design. Rapid cooling of the glass melt is aided by the heat that can be absorbed by the many metals that may be used in this apparatus, compared to the heat in the glass.

TABLE I

| Material | Relative Heat Absorbing Rate |
|---|---|
| Platinum | 3.0 |
| Copper (Cu) | 3.45 |

TABLE I-continued

| Material | Relative Heat Absorbing Rate |
|---|---|
| Iron (Fe) | 3.5 |
| Glass | 0.75 |

The capacitor forming method can use special thermal control techniques to manage the volume of glass flowing into contact with the metal foil ribbon to be squeezed to the proper thickness. These heat control methods are commonly known and used by glass technicians, who can cool or heat small areas on the hot glass as it flows from the movable cartridge into the roll squeezing area (cooled roller and moving metal ribbon).

The capacitor forming method utilizes a movable cartridge containing "melted and refined glass" to dispense liquid glass continuously onto the site above the metal foil ribbon that moves on compression rollers made of high carbon iron or graphite. The cartridge must include a ceramic insulated liner on the outside or inside of a shell made of a suitable metal, such as Kovar or platinum.

The capacitor forming method utilizes forming rollers that do not stick to molten glass. Materials like graphite and high carbon iron are common to the glass molding industry, where hot glass and formed glass shapes do not stick to the forming molds.

The capacitor forming method uses alternative high-temperature resistant metal ribbon that can withstand the ferroelectric-melt pouring temperature. The best possible metal ribbon may be made of platinum. Metals that may be considered for this process design include: platinum, gold-clad nickel, 304 stainless steel, Hastelloy C, Kovar, nickel, selected brass compositions and OFHC copper, and have a ribbon thickness between 0.0003 and 0.003 inches, and preferably near 0.001 inches in thickness. Some metals may be pre-oxidized and perhaps pre-borated for glass wetting. The use of a metal ribbon 0.001 inches in thickness or less will negate the expansion coefficient difference between glass and metal.

The coefficient of thermal expansion for most metals may be significantly higher than the glass or devitrified glass. By selecting thin metal foil, a metal, such as platinum, if annealed, will yield under stress caused by the expansion and contraction differences with the glass. Platinum is expensive, but is expected to work well in this application. During high temperature heat treating for the other metals avoid the oxidation of Kovar and stainless steel by using a nitrogen atmosphere. Copper is not very refractory and would also require a non-oxygen atmosphere in the heat-treating kilns.

The capacitor forming method utilizes a ferroelectric glass composition, like barium oxide and titanium dioxide that can be refined and pre-melted off site or away from the apparatus. The melted composition must be delivered in a sliding or movable capsule to deliver hot melt in an unending flow to the pour area.

The capacitor forming method may use different metal foil types and various devitrifying ferroelectric glass composition or standard non-devitrifying glass formulations that, when squeezed together, make a useful product at a fast rate when forming a metal-glass-metal sandwich into a flat or spooled form. Heat treating is used to devitrify the glass that can form into high dielectric constant ferroelectric crystals of small size, which are embedded within the remaining glass phase.

The capacitor forming method utilizes formulations of glass not intended to devitrify. All glasses, including those intended to be devitrified, must have very high surface and volume resistivity to hold an electric charge within the dielectric for a long period of time. The electrical charge, once loaded in the dielectric, must not bleed away easily with the passing of time. The chemical formulae for glasses that achieve high volume and surface resistivity are needed for this production, but this technical data is not made public. This data is not reported in public technical publications.

Electrical parameters must be considered proprietary to any serious commercial enterprise. The resistivity (ohm-cm) of the dielectric must approach or exceed $10^{17}$ ohm-cm when measured in the temperature range from 30° C. to 120° C. For a non-devitrified glass, an achieved dielectric constant for a glass dielectric might be 15, and combined with high resistivity, this glass could be quite valuable for the small capacitor or printed circuit board market. But the preferred material will have a uniform higher dielectric constant between 2000 and 20000+ for the temperature range from 30° C. and 120° C. and will be a microcrystalline ferroelectric made from glass, as described here. If this glass-formed ferroelectric also has a high resistivity and high DC breakdown resistance, this chemical formulation will make an energy storage method to compete strongly with batteries.

After forming and annealing the final laminated assembly to room temperature, the common metal electrodes that extend out from the fabricated capacitor may be cleaned, welded together and then electrically connected to a female plug-in electrical terminal to allow safe electrical connection when a high voltage is stored in this capacitor or supercapacitor. To complete steps intended to manufacture this product, the laminate assemble could then be dipped in a dielectric polymer and molded in a polymer jacket to form a super-capacitor or capacitor as a final product.

It is contemplated that the final product will hold an electric charge for an extended period for time, and will do so because the resistivity of the starting glass composition or devitrified glass is higher than $10^{17}$ ohm-cm at ambient temperatures. Similarly, if the dielectric constant and the breakdown voltage of the final glass or devitrified glass are high and uniform in value with change in temperature from 30° C. to 120° C., this production system may eliminate lithium batteries and IC engines in cars and trucks that use gasoline and diesel fuel.

A fast production method of forming devitrified glass ferroelectric capacitors is presented herein. The design apparatus needed to streamline the production of a devitrified glass-metal foil capacitor has heretofore never been advanced. When viewing a huge market, unit cost is major. The volume of super-capacitors needed for the auto industry alone is between 10 and 40 million units per year. It is glass forming at 25% the cost of ceramic forming that will make glass forming a winner.

Figure 1:
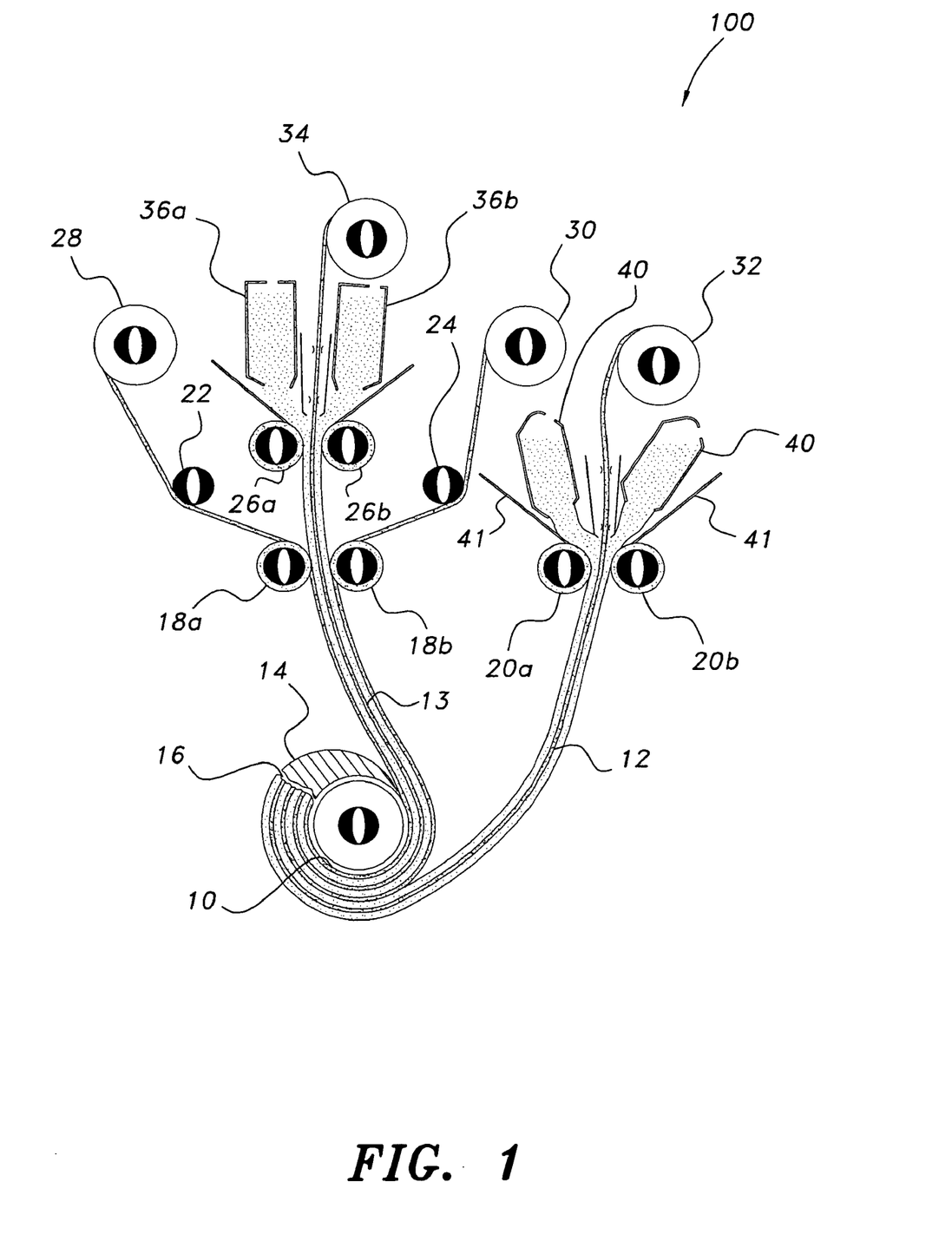
FIG. 1 is a diagrammatic side view of an apparatus forming a capacitor according to a first embodiment of a capacitor forming method according to the present invention.

In a first embodiment of the capacitor forming method, as shown in FIG. 1, a lowest point spool 10 takes up a three metal foil-two glass layer composite ribbon 13 while concurrently taking up a ribbon 12 comprising a single metal foil coated on both sides with glass. Preferably the spool 10 has an outer thin ceramic ramp surface 14. The ribbons 12 and 13 being spooled by lowest point spool 10 are insulated and held together by an adhesive 16, preferably Sauereisen cement No. 1.

Ribbon 12 originates from a spool 32 that is disposed above movable hot glass cartridges 40. Liquid glass flowing out of glass cartridges 40 is pressed onto the metal ribbon by rollers 20a and 20b to form the coated ribbon 12. The liquid glass is constrained by platinum bin 41, which funnels the liquid glass proximate the glass pressing location.

Figure 2:
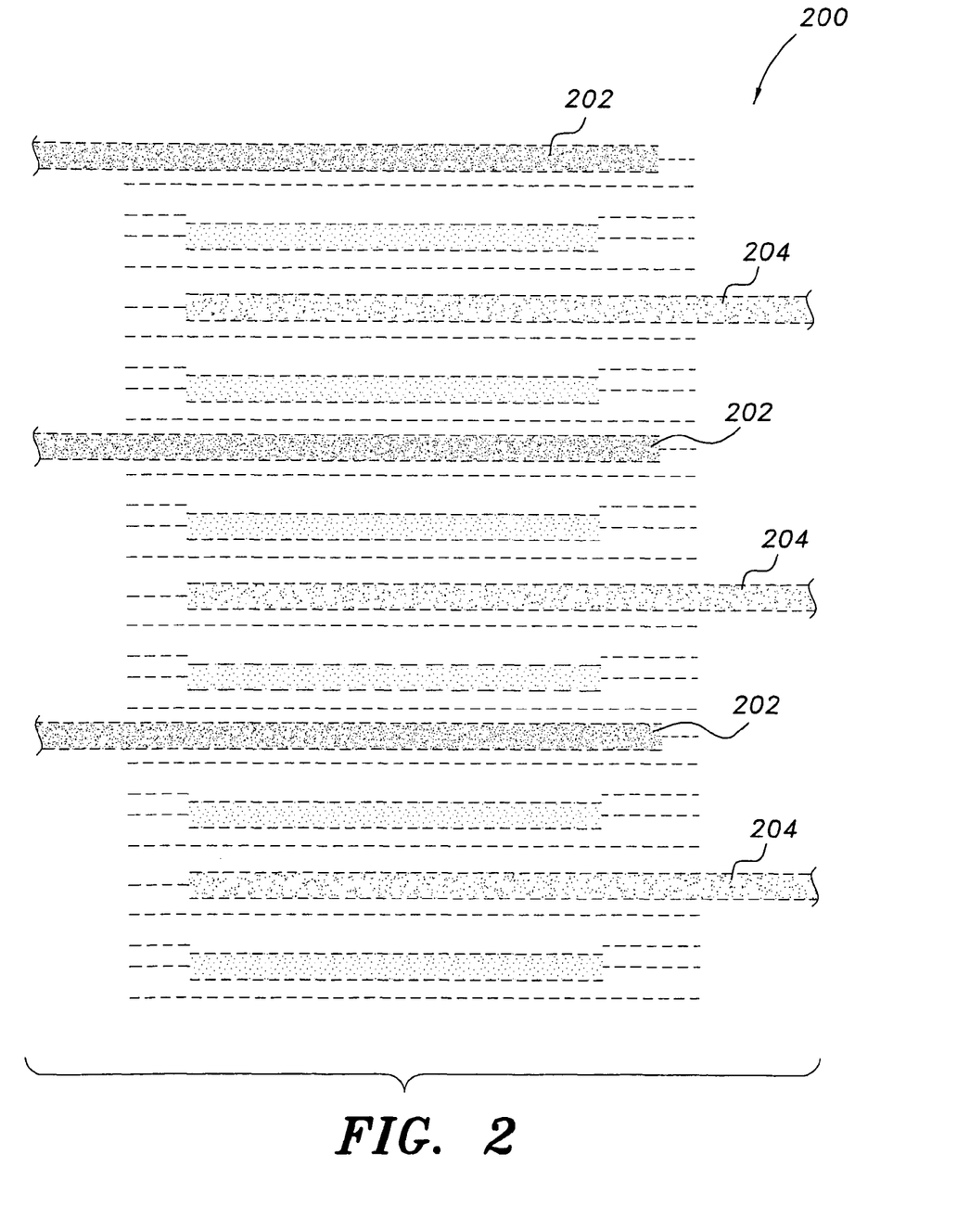
FIG. 2 is a partial diagrammatic side view of an exemplary capacitor formed by the capacitor forming apparatus and method of FIG. 1.

The composite ribbon 13 includes a central metal foil component that originates from spool 34 above removable or moving hot glass cartridges 36a and 36b. The volume of viscous glass dispensed from cartridges 36a and 36b is constrained by pinching rollers 26a and 26b. Lateral surface metal foil components are dispensed from foil spools 28 and 30 and are guided by rollers 22 and 24. The pressing operation that forms composite ribbon 13 is accomplished via spools 18a and 18b, which are preferably air or water-cooled graphite or high carbon iron rollers. After one of these two locations, the glass-metal-glass is immediately squeezed between two metal foils, and then spooled. The other glass-metal-glass is wound on the spool. The process performed by the apparatus 100 and capacitor forming method forms a spooled super capacitor having negative plate layers 202 and positive plate layers 204 separated by dielectric material, as shown in FIG. 2, 200. The spooled laminate must then be immediately heat soaked as in a tunnel kiln and cooled in Lehr as described for the laminate formed in FIG. 5 by apparatus 500.

Figure 3:
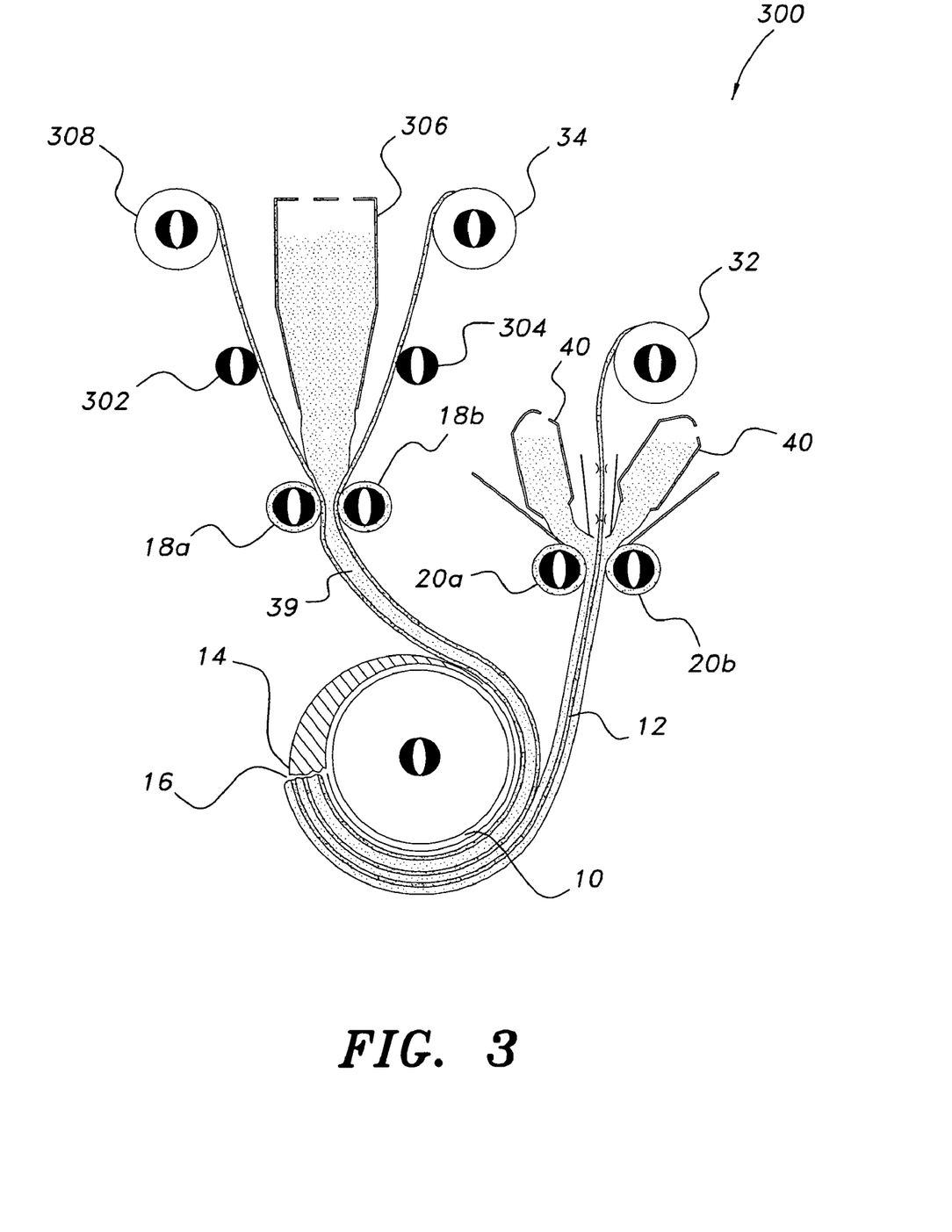
FIG. 3 is a diagrammatic side view of an apparatus forming a capacitor according to a second embodiment of a capacitor forming method according to the present invention.
Figure 4:
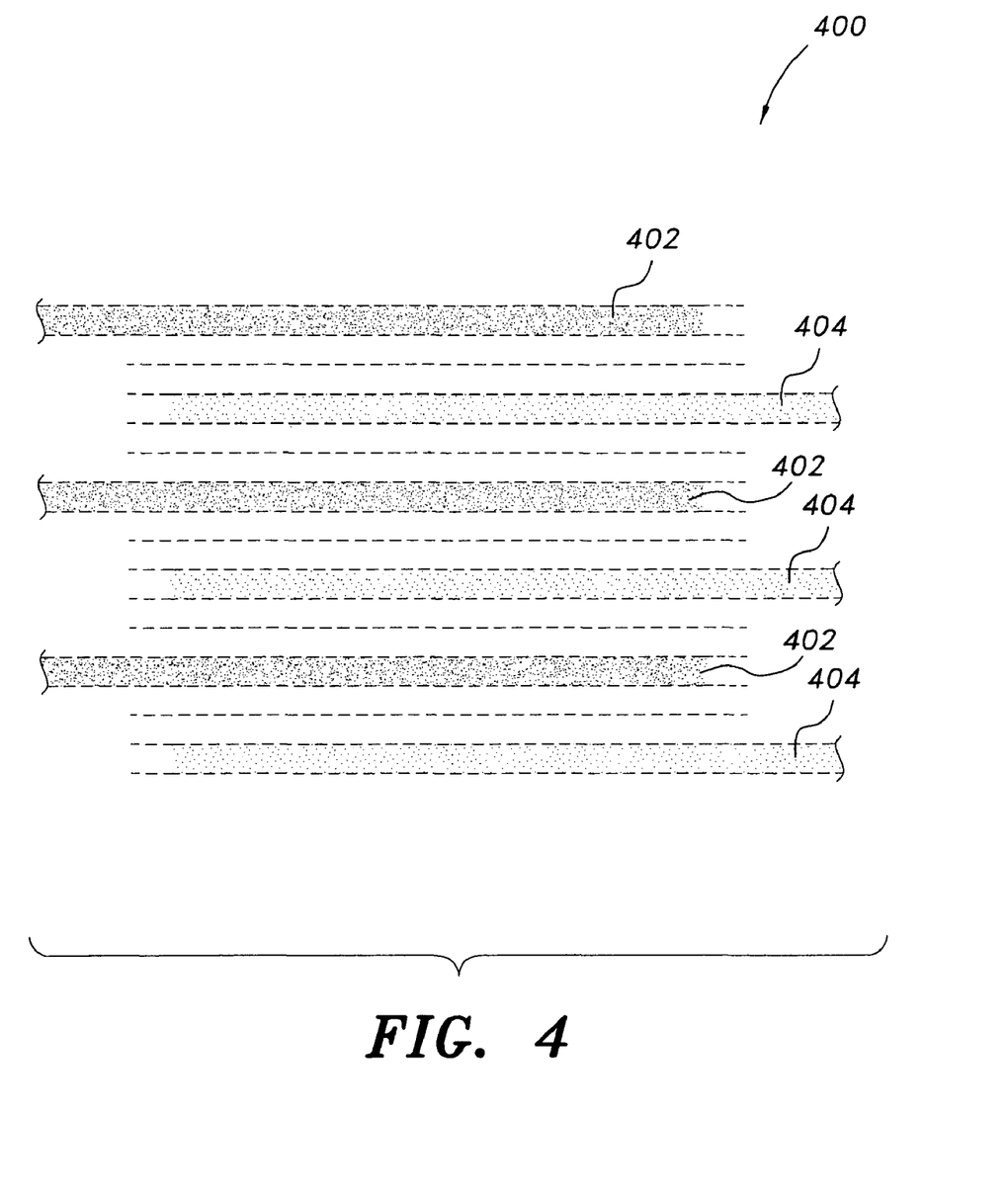
FIG. 4 is a partial diagrammatic side view of a capacitor formed by the capacitor forming apparatus and method of FIG. 3.

In capacitor forming device 300, two metal foils sandwich a glass layer on the left, and one metal foil is coated on both sides with glass on the right. Both are wound on the spool, thereby forming a spooled capacitor. As most clearly shown in FIG. 3, the glass coated foil ribbon 12 is combined with a foil coated glass ribbon 39. The two foil coats for ribbon 39 originate at spools 308 and 34, the foil coats being guided by guide rollers 302 and 304, respectively, before being pressed to the glass by pressing rollers 18a and 18b, respectively. The glass flow originates from moving or removable hot glass cartridge 306. The spooled laminate must then be immediately heat soaked as in a tunnel kiln and cooled in a Lehr, like the laminate formed in FIG. 5. As shown in FIG. 4, the spooled capacitor 400 has negative plates 402 and positive plates 404 separated by a dielectric.

Figure 5:
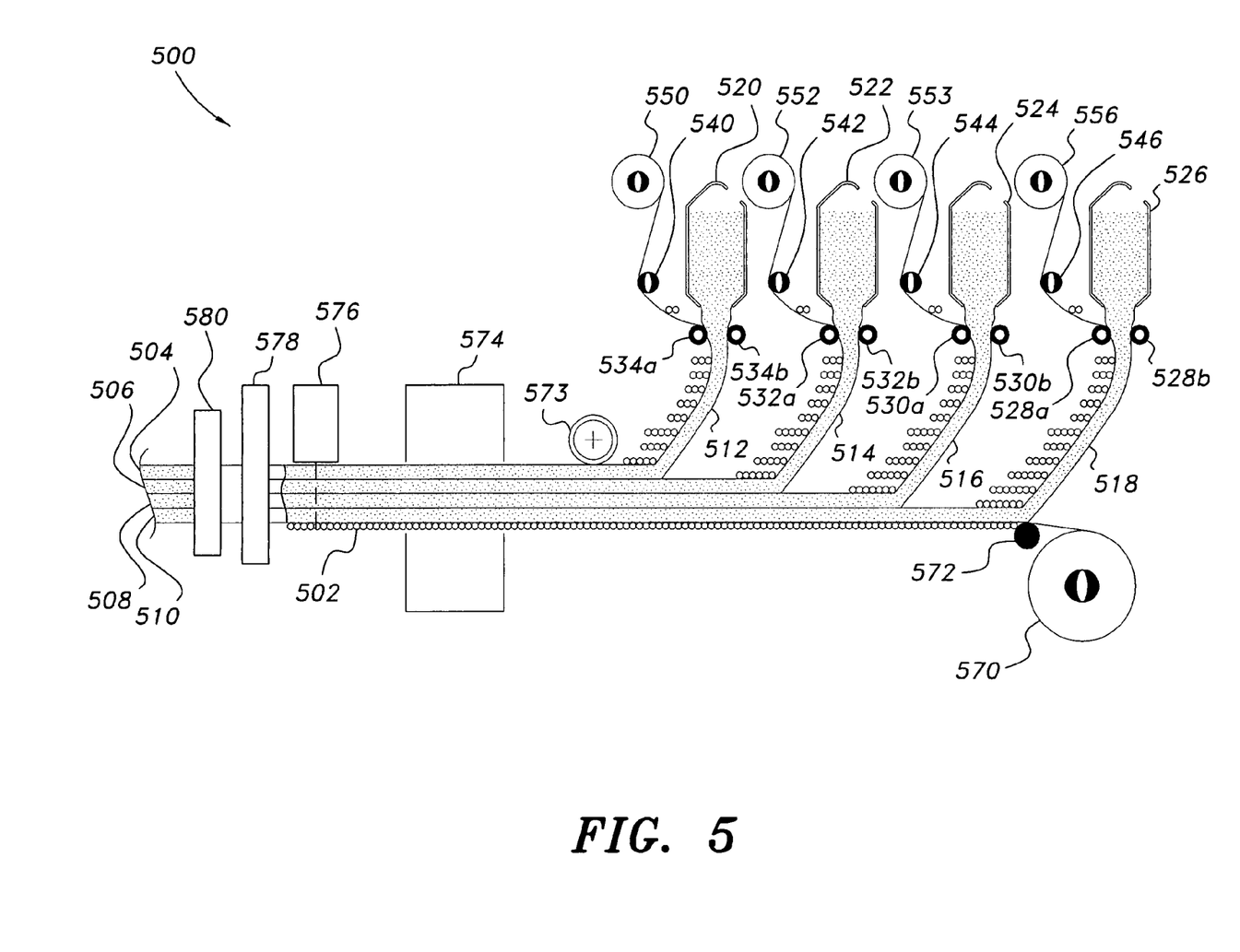
FIG. 5 is a diagrammatic side view of an apparatus forming a capacitor according to a third embodiment of a capacitor forming method according to the present invention.

A five metal foil are coated with glass by apparatus 500, shown in FIG. 5. A roller or belt driven forming table is used to initially form the laminate. Then the laminate moves on to a roller kiln to heat-soak the glass. After an initial heat soak, the flat laminate may be "laser cut" into useful shapes. The cut shapes may be reloaded onto tunnel kiln car that can also fit into a Lehr oven. After the heat soak is completed in the tunnel kiln the car can be rolled into a Lehr, for the purpose of annealing the assembly (slow cooling) the laminate back to room temperature. As most clearly shown in FIG. 5, the hot glass is sourced from cartridges 520, 522, 524, and 526. Each of the cartridges has an aperture to allow air to be infused into the hot glass. Metal foil originating spools 550, 552, 553 and 556 dispense metal foil that combines with glass from cartridges 520, 522, 524, and 526, respectively. Respective guide rollers 540, 542, 544, and 546 are used to pretension the metal foil before it is threaded through cooling-laminate applying roller combinations 534a-534b, 532a-532b, 530a-530b, and 528a-528b. Glass surfaces 512, 514, 516 and 518 encapsulate the foil layers associated with subsequent dispensing cartridges in the laminate series. Glass layer 518 is combined with a base metal foil dispensed at approximately 1 foot per second from base spool 570 and is guided by metal roller 572 to add the fifth layer to the capacitor. A flat bed of rollers 502 holds the foil-glass mix in a flat configuration while undergoing forced air cooling. The forced air cooling preferably rapidly drops viscosity of the glass to approximately log $10^{4-5}$ poise to start the devitrification process. The foil-glass mix is continuously fed over the flat bed of rollers 502 by a water-cooled drive roller 573. An approximately 2000-foot long portion of the flat bed rollers 502 extends through a heat-treating kiln 574 that allows devitrification of the foil-mix to proceed. Preferably roller kiln 574 holds the foil-mix to between approximately 600° C. and approximately 900° C. for approximately thirty minutes. A laser cutter 576 is disposed over the foil-mix downstream from roller kiln 574 and cuts the foil-mix into desired capacitor form factors. The flat form factors are loaded on a kiln car for travel through tunnel kiln 578 and a Lehr kiln 580 arranged further downstream to complete slow devitrification and cooling the capacitor glass sheets 504, 506, 508, and 510 to 30° C., respectively.

Figure 6:
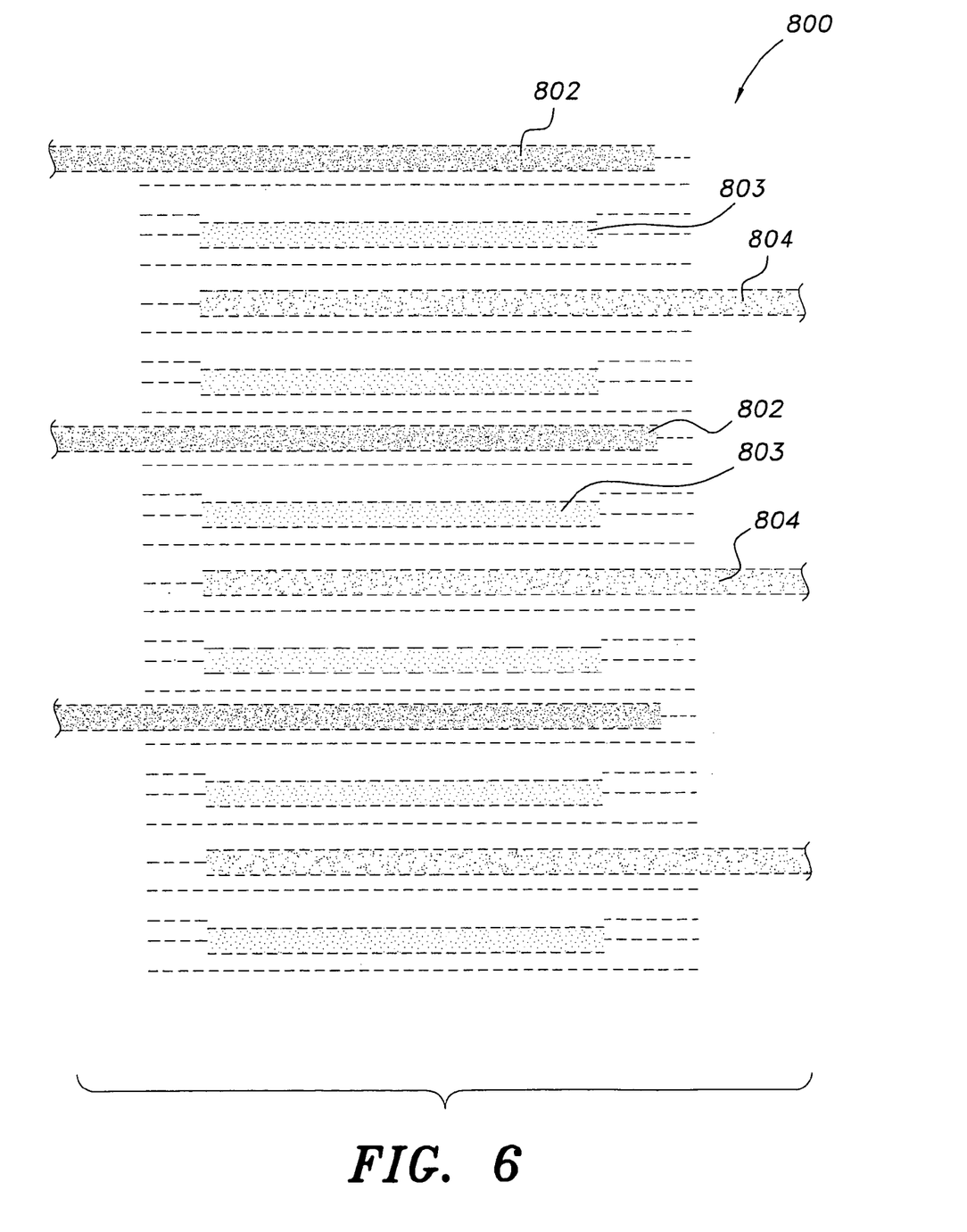
FIG. 6 is a partial diagrammatic side view of a capacitor formed by the capacitor forming apparatus and method of FIG. 5.

The process makes a super capacitor 800 of a flat design, which is detailed in FIG. 6. The negative metal 802 is followed by a neutral metal 803, which is followed by a positive metal 804, dielectric material being disposed between the metals. The pattern is repeated for the extent of the capacitor.

Figure 7:
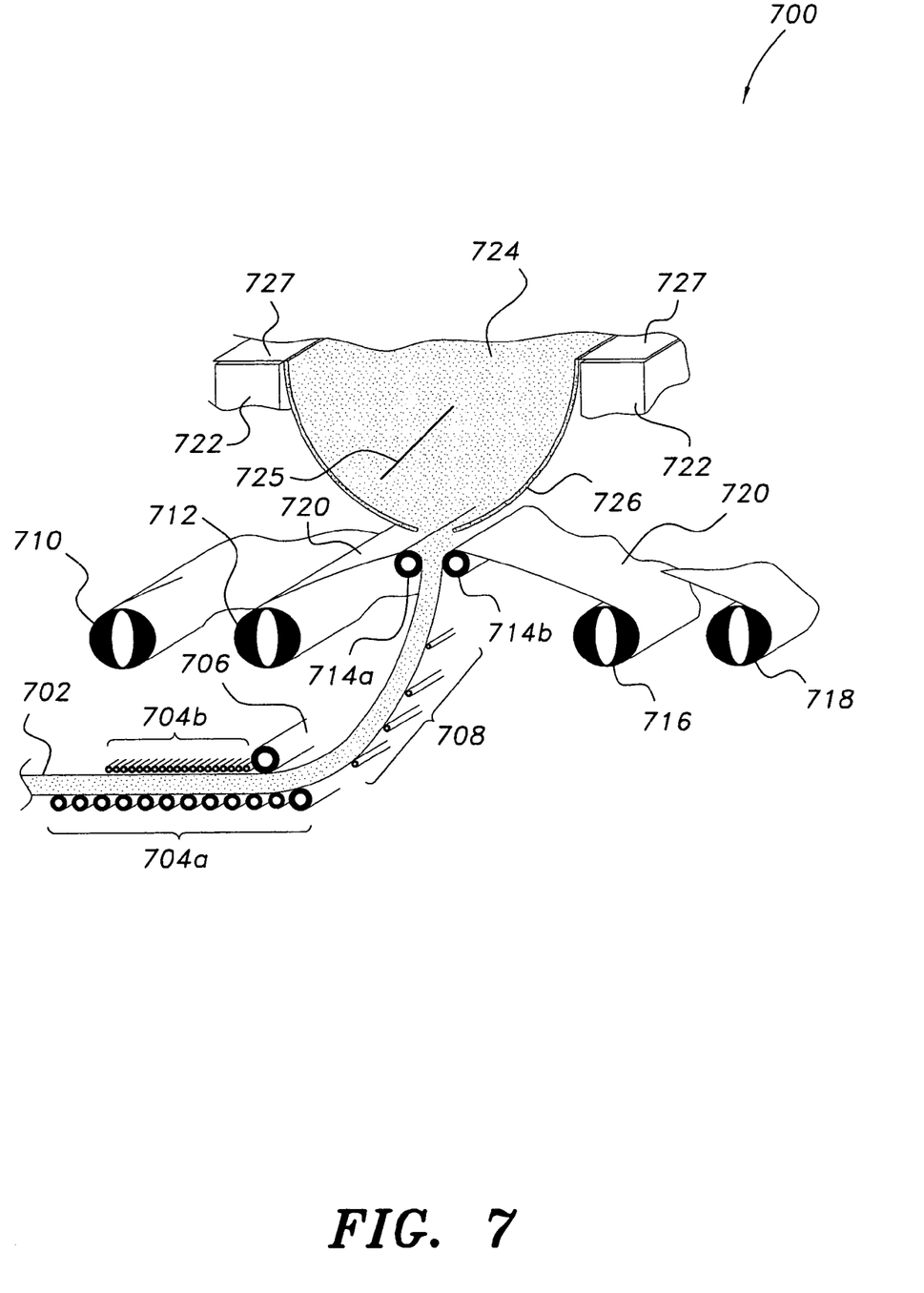
FIG. 7 is a diagrammatic side view of and apparatus forming a capacitor according to a fourth embodiment of a capacitor forming method according to the present invention.

FIG. 7 shows a simple capacitor forming apparatus 700. A platinum trough 726 used to hold hot glass 724 has a pair of flanges 727, which are attached to support beams 722, thereby providing support to the trough 726. The trough 726 is not intended to be mobile because it is big enough to be a reservoir into which melted glass can continuously flow from a specialized melting unit.

A resistance wire 725 is disposed in the trough 726. When the resistance wire 725 is electrically energized, it heats the glass 724 within the trough to keep the glass 724 fluid and flowing downstream. The configuration of trough 726 and pressing rollers 714a and 714b with respect to quick change metal foil roll 710, metal foil roll 712, metal foil roll 716, and quick change metal foil roll 718 provides control over a small volume of glass as it is brought into contact with a moving metal foil or foils, thereby forming a useful capacitor product.

The configuration of pressing rollers 714a and 714b precisely controls the volume of the glass melt traveling downstream through the mechanism, thereby allowing the glass to be fluid enough so that it flows to fill the void between the metal foils 720, while also dropping rapidly in temperature by about 200° C. to 300° C. as the glass comes in contact with the cooling metal foil and backing roller. The process prevents devitrification, yet allows sufficient time to allow the glass to take shape between the metal ribbons while the glass is still about 10,000 Poise in fluidity. Flow downstream of the metal-glass-metal laminate 702 is guided by a plurality of guide rollers 708 until the laminate 702 is pressed and guided by upper rollers 706, 704b, along with lower rollers 704a. The formed laminate must be given follow-on roller kiln heat treatment for devitrification, laser cutting of the laminate, heat soak in a tunnel kiln and Lehr cooling, as described in devices 500 in FIG. 5.

Figure 8:
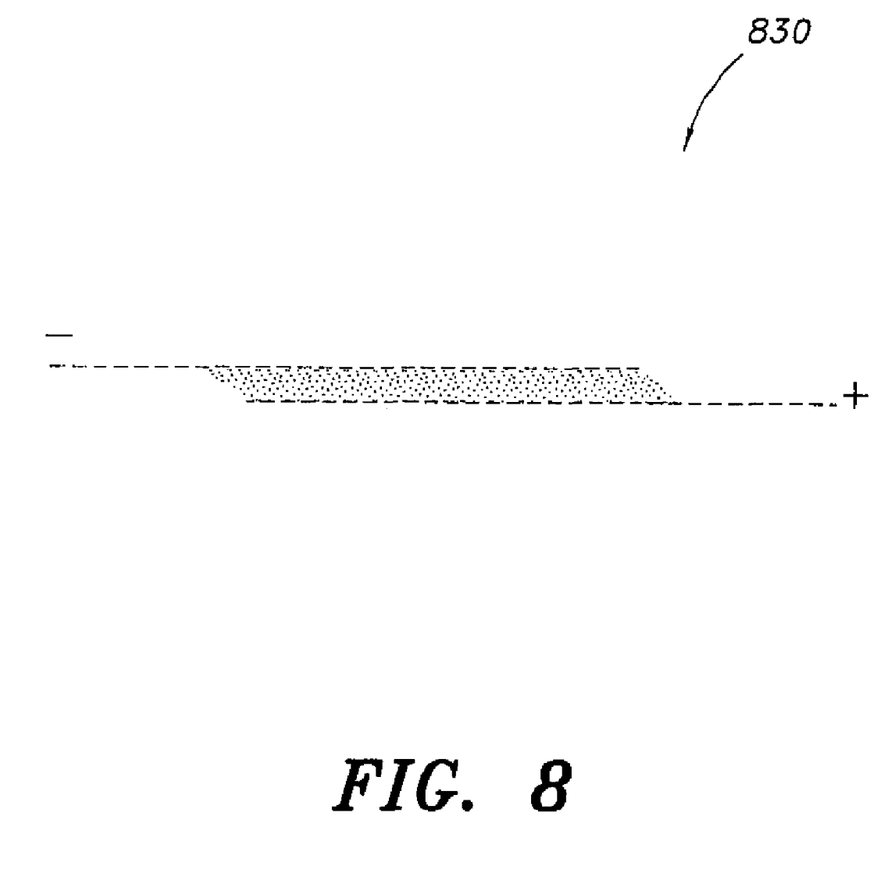
FIG. 8 is a diagrammatic side view of an exemplary capacitor formed by the capacitor forming apparatus and method of FIG. 7.

Thus, the apparatus controls the volume of glass and controls the metal foils to quench and shape the glass to form the metal-glass-metal laminate capacitor 830 shown in FIG. 8.

Figure 9:
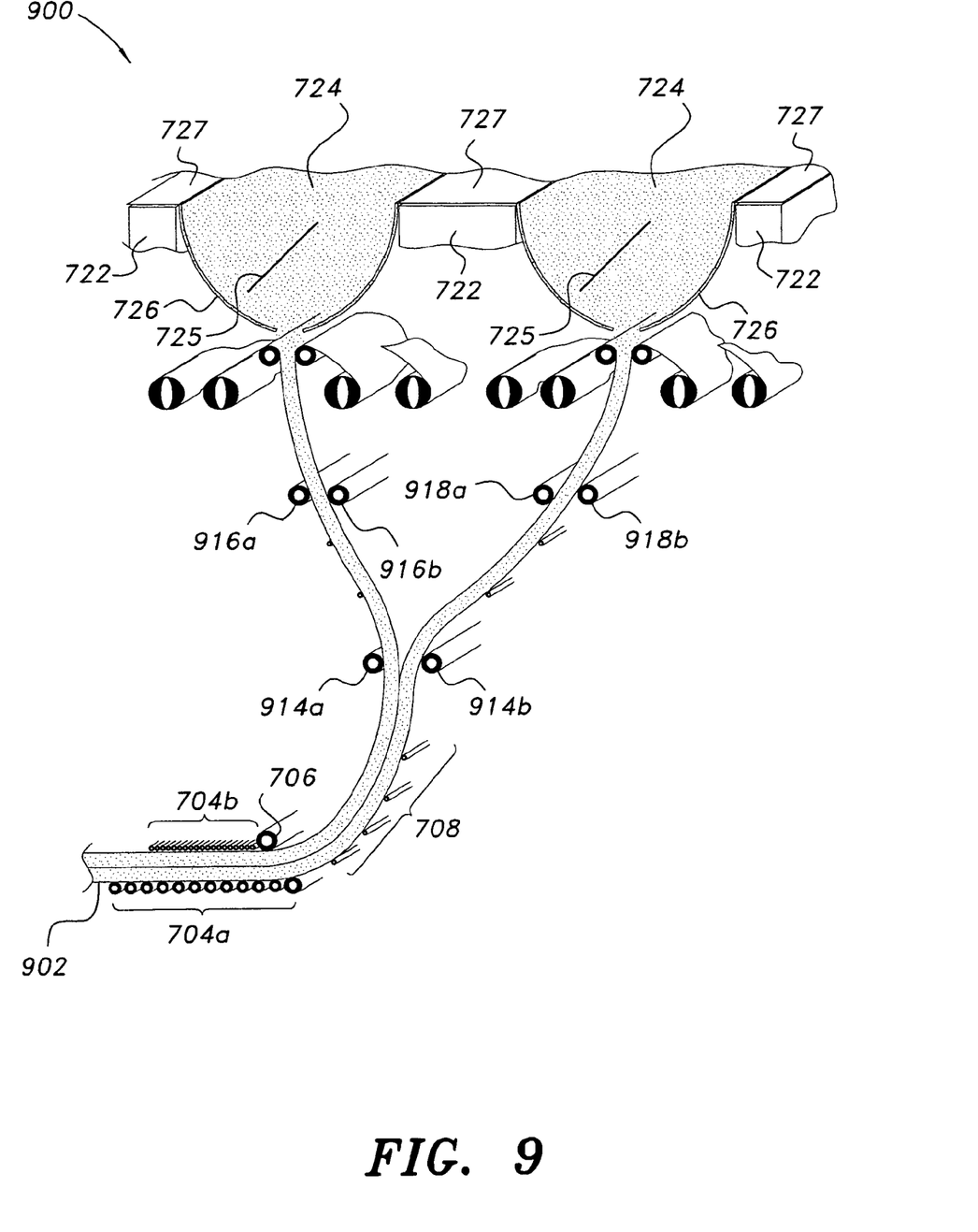
FIG. 9 is a diagrammatic side view of an apparatus forming a capacitor according to a fifth embodiment of a capacitor forming method according to the present invention.

As shown in FIG. 9, two capacitors can be formed back-to-back by combining two of the platinum trough devices 700 to hold the hot glass 724.

The troughs 726 are not intended to be mobile. They must have sufficient volume to form reservoirs that hold enough melted glass 724 to provide temperature control and flow control, yet provide for the continuous refill and flow from a specialized melting unit.

Figure 10:
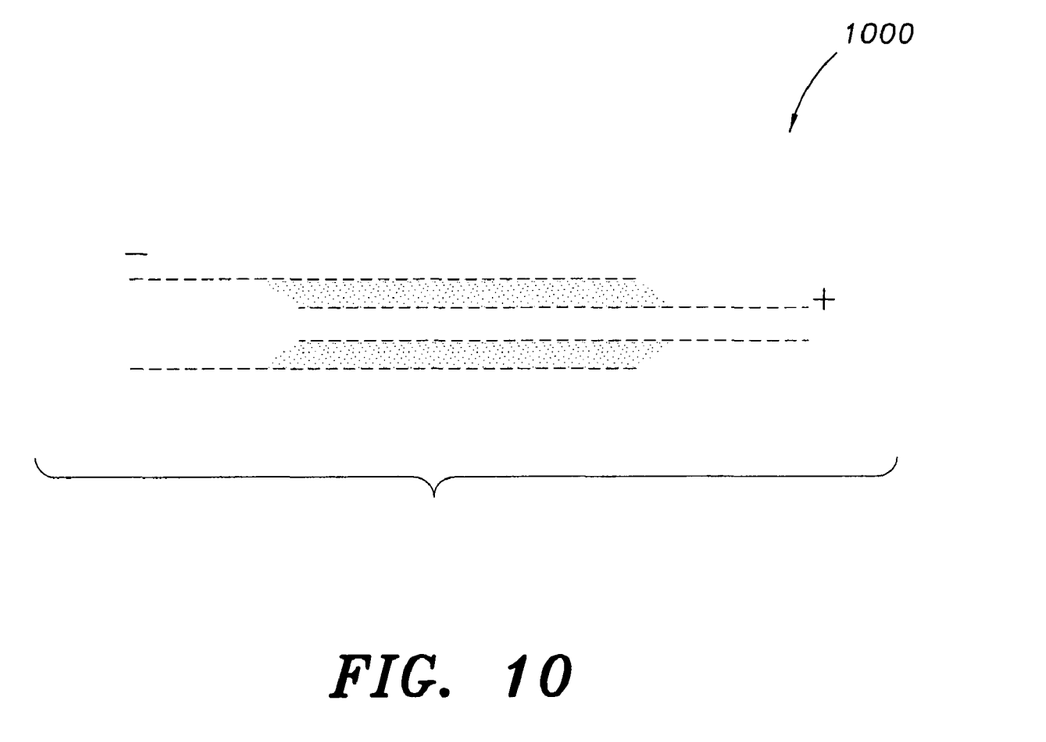
FIG. 10 is a diagrammatic side view of an exemplary capacitor formed by the capacitor forming apparatus and method of FIG. 9.

A resistance wire 725 is used as a heater in the trough to keep the glass fluid and flowing. The method of controlling and delivering a small volume of glass that can be continuously quenched (i.e., reduced in temperature) when it is brought into contact with moving metal foil(s) is the same as the method described above with respect to the device 700. First and second individual laminates are pressed by roller groups 916a, 916b and 918a, 918b, respectively. The first and second laminates are then joined downstream by laminate joining rollers 914a and 914b to form the dual laminate back-to-back capacitors 1000, shown in FIG. 10. Drive roller 706 and roller systems 704a and 704b maintain a flat laminate configuration 902. This laminate form must then be heat treated in a roller kiln, undergo laser cutting, tunnel kiln heat soak and Lehr cooling as described in devices 500 of FIG. 5.

In summary, the technology proposed here defines a manufacturing apparatus and a series of processing steps needed to automate the manufacture of a capacitor with a special dielectric. The forming technology presented here is very different from a slow, hot press ceramic forming method now being marketed for the same ferroelectric, $BaTiO_3$. A major advantage of a devitrified glass derived ferroelectric is that there is no porosity. Unfortunately, ceramic-formed ferroelectric crystals have pores around them. The estimated unit cost to make a ceramic ferroelectric is probably higher by a factor of 4×. Technical performance for the ceramic in terms of holding an electrical charge is not projected as good as a devitrified glass approach.

It is to be understood that the present invention is not limited to the embodiments described above, but encompasses any and all embodiments within the scope of the following claims.

I claim:

1. A super capacitor forming method, comprising the steps of:
    forming first, second, third and fourth dielectric sheets of viscous glass material, each of the sheets having a first and a second surface;
    rolling a first thin metal foil onto the first surface of the first dielectric sheet while the first dielectric sheet has a viscosity of approximately 10,000 poises;
    rolling a second thin metal foil onto the first surface of the second dielectric sheet while the second dielectric sheet has a viscosity of approximately 10,000 poises;
    rolling a third thin metal foil onto the first surface of the third dielectric sheet while the third dielectric sheet has a viscosity of approximately 10,000 poises;
    rolling a fourth thin metal foil onto the first surface of the fourth dielectric sheet while the fourth dielectric sheet has a viscosity of approximately 10,000 poises;
    combining the first, the second, the, third, and the fourth dielectric sheets, the first dielectric sheet being on a top layer, the fourth dielectric sheet being on a bottom layer;
    rolling a fifth thin metal foil onto the second surface of the fourth dielectric sheet while the fourth dielectric sheet has a viscosity of approximately 10,000 poises, thereby forming a five metal foil-glass laminate;
    cooling the dielectric sheets concurrently with the thin metal foil rolling steps;
    heat-soaking the viscous glass material portion of the five metal foil-glass laminate; and
    annealing the five metal foil-glass laminate, whereby said super capacitor is formed in a flat configuration.

2. The capacitor forming method according to claim 1, further comprising step of infusing cooling air directly into the glass dielectric sheets during said forming process of the glass dielectric sheets.

3. The capacitor forming method according to claim 1, wherein a roll dispensing rate of said fifth metal foil is approximately one foot per second.

4. The capacitor forming method according to claim 1, further comprising the step of subjecting said five metal foil-glass laminate to forced air cooling before initiating said five metal foil-glass annealing process.

* * * * *